US006376079B1

(12) United States Patent
Kawamoto et al.

(10) Patent No.: US 6,376,079 B1
(45) Date of Patent: *Apr. 23, 2002

(54) SEMICONDUCTING CERAMIC AND SEMICONDUCTING CERAMIC ELECTRONIC ELEMENT

(75) Inventors: Mitsutoshi Kawamoto, Hirakata; Hideaki Niimi, Hikone, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,343

(22) Filed: Mar. 30, 1999

(30) Foreign Application Priority Data

Apr. 13, 1998 (JP) ............................................ 10-101156

(51) Int. Cl.$^7$ ................................................ B32B 7/02
(52) U.S. Cl. ........................ 428/409; 501/136; 501/137; 501/138; 501/139
(58) Field of Search ................................ 428/472, 688, 428/469, 471, 689; 501/136, 137, 138, 139; 252/519.12, 519.1; 361/301.4, 321.1, 321.5

(56) References Cited

U.S. PATENT DOCUMENTS 4,863,883 A  9/1989  Menashi et al. ............ 501/138
6,162,752 A * 12/2000  Kawamoto et al. ......... 501/137

OTHER PUBLICATIONS

JP 06064924 A (Teika Corp.), Mar. 8, 1994; Patent Abstracts of Japan.

* cited by examiner

*Primary Examiner*—Robert R. Koehler
(74) *Attorney, Agent, or Firm*—Ostrolenk, Faber, Gerb & Soffen, LLP

(57) ABSTRACT

The present invention provides a semiconducting ceramic which possesses a dielectric strength of 800 V/mm or more and a specific resistance at room temperature of 100 Ω·cm or less, the specific resistance at room temperature undergoing substantially no time-course change. The semiconducting ceramic is formed of a sintered semiconducting material containing barium titanate, wherein the average grain size of the semiconducting ceramic is about 1.0 μm or less and the relative spectral intensity ratio represented by $BaCO_3/BaO$, which is determined by XPS at the surface of the ceramic, is 0.5 or less.

10 Claims, No Drawings

US 6,376,079 B1

SEMICONDUCTING CERAMIC AND SEMICONDUCTING CERAMIC ELECTRONIC ELEMENT

BACKGROUND OF THE INVENTION

1. Field of the Invention

The present invention relates to a semiconducting ceramic, and, more particularly, to a semiconducting ceramic comprising barium titanate. The present invention also relates to a semiconducting ceramic electronic element formed from the semiconducting ceramic.

2. Related Art

Conventionally, electronic elements for controlling temperature, limiting current, generating heat at constant temperature, and like applications have employed a semiconducting ceramic having a positive-temperature-coefficient characteristic (hereinafter referred to as a PTC characteristic); i.e., wherein electric resistance thereof drastically increases at a temperature higher than Curie temperature. With regard to such a semiconducting ceramic, barium titanate ceramics have widely been used.

In recent years, there has arisen demand for a semiconducting ceramic electronic element for the above applications which has a high withstand voltage (i.e., high dielectric strength) and thus can be used at high voltage. Particularly, a semiconducting ceramic electronic element employed in a overcurrent-protecting element for electric circuits must have high withstand voltage.

The dielectric strength of a semiconducting ceramic is generally known to increase when the grain size thereof decreases. Therefore, studies have been conducted for forming micrograms of a semiconducting ceramic in order to increase the withstand voltage. For example, Japanese Patent Application Laid-Open (kokai) No. 4-26101 discloses that incorporation of $Dy_2O_3$ and $Sb_2O_3$ into a semiconducting ceramic formed of $SrTiO_3$ and $BaTiO_3$ containing $TiO_2$, $SiO_2$, $Al_2O_3$ and $MnO_2$ provides a semiconducting ceramic having high withstand voltage and low specific resistance. Although the specific resistance is as low as 50 $\Omega \cdot cm$, the dielectric strength is about 200 V/mm, which is still unsatisfactory. In addition, the grain size is disadvantageously as large as 6–15 $\mu m$.

Japanese Patent Publication (kokoku) No. 60-25004 discloses that a semiconducting ceramic having a grain size of 1–5 $\mu m$ and a maximum dielectric strength of 500 V/mm is obtained by crushing and mixing barium titanate and Sb oxide serving as a semiconducting agent; calcining under controlled conditions; compacting under controlled conditions; and firing the compact at 1350° C. However, the dielectric strength is still insufficient for fulfilling the recent demand for high withstand voltage, and higher dielectric strength is required.

Meanwhile, in order to enhance dielectric strength, attempts have been made to reduce the grain size of a semiconducting ceramic to 1.0 $\mu m$ or less. However, when the average grain size of the semiconducting ceramic decreases, the specific resistance of the ceramic at room temperature disadvantageously exhibits an increase over the course of time (hereinafter referred to as "time-course increase.")

There is a relationship between the ratio represented by $BaCO_3/BaO$ and time-course change of specific resistance at room temperature. When barium titanate is synthesized from barium carbonate and titanium oxide, unreacted barium carbonate generally remains on the surfaces of barium titanate particles in a trace amount. Unreacted barium carbonate provides barium oxide during firing. Although the barium oxide remains in ceramic grains immediately after firing, when the ceramic is allowed to stand in air the barium oxide reacts with the carbon dioxide in the air to thereby segregate in grain boundaries as a barium carbonate phase having high electric resistance. The present inventors have found that the barium carbonate phase formed in the grain boundaries causes an increase of specific resistance at room temperature, and the increase can be prevented by controlling the relative spectral intensity ratio represented by $BaCO_3/BaO$ of the barium titanate-based semiconducting ceramic. The present invention has been accomplished based on this finding.

SUMMARY OF THE INVENTION

An object of the present invention is to provide a semiconducting ceramic which has a dielectric strength of 800 V/mm or more and a specific resistance at room temperature of 100 $\Omega \cdot cm$ or less, the specific resistance at room temperature undergoing substantially no time-course change.

Another object of the present invention is to provide a semiconducting ceramic electronic element produced from the same.

Accordingly, in a first aspect of the present invention, there is provided a semiconducting ceramic formed of a sintered semiconducting material containing barium titanate, which ceramic has an average grain size of about 1.0 $\mu m$ or less and a relative spectral intensity ratio represented by $BaCO_3/BaO$ of 0.5 or less as determined by XPS at a surface of the ceramic.

The semiconducting ceramic according to the first aspect of the present invention possesses a dielectric strength of 800 V/mm or more and a specific resistance at room temperature of 100 $\Omega \cdot cm$ or less, the specific resistance at room temperature undergoing substantially no time-course change.

In a second aspect of the present invention, there is provided a semiconducting ceramic electronic element in which an electrode is formed on each major surface of the semiconducting ceramic as described in the first aspect of the present invention.

The specific resistance of the semiconducting ceramic electronic element according to the second aspect of the present invention exhibits no time-course change at room temperature. In addition, dielectric strength is also enhanced due to barium titanate having an average grain size of 1.0 $\mu m$ or less. Furthermore, the thickness of the semiconducting ceramic electronic element can be reduced to as little as 0.7–1.0 mm, whereas the thickness of a conventional semiconducting ceramic electronic element is approximately 2 mm.

DETAILED DESCRIPTION OF PREFERRED EMBODIMENTS

As described above, the present invention provides a semiconducting ceramic formed of a sintered semiconducting material containing barium titanate, wherein the average grain size of the semiconducting ceramic is about 1.0 $\mu m$ or less and relative spectral intensity ratio represented by $BaCO_3/BaO$ as measured by XPS at a surface of the ceramic is 0.5 or less.

Barium titanate used in the semiconducting ceramic according to the present invention is not limited only to $BaTiO_3$; there may also be used as the barium titanate of the present invention a barium titanate-based species in which the Ba is partially substituted by Sr, Ca, Pb, Y, a rare earth element, etc., or the Ti is partially substituted by Sn, Zr, Nb, W, Sb, etc.

$MnO_2$, $SiO_2$, $TiO_2$, $Al_2O_3$, etc. may be added in an appropriate amount to a semiconducting material containing barium titanate for producing the semiconducting ceramic according to the present invention.

The average grain size of the semiconducting ceramic according to the present invention is limited to about 1.0 μm or less, although the ceramic may contain ceramic grains having a grain size in excess of about 1.0 μm.

The relative spectral intensity ratio represented by $BaCO_3$/BaO at the surface of the semiconducting ceramic must be 0.50 or less. As used herein, the term "surface" refers to a portion of the semiconducting ceramic that is in contact with air. Thus, a cut section is also included.

In the present invention, the expression "specific resistance at room temperature undergoing substantially no time-course change" refers to a case in which the ratio of specific resistance at room temperature 1000 hours after the termination of firing to that immediately after firing is 1.05 or less.

EXAMPLES

The present invention will next be described by way of example.

First, there were prepared aqueous solutions of barium hydroxide having a variety of Ba contents and an isopropyl alcohol (hereinafter referred to as IPA) solution of Ti alkoxide represented by $Ti(O-iPr)_4$ having a Ti content of 2.655 mol. Secondly, a solution of lanthanum chloride represented by $LaCl_3 \cdot 3H_2O$ (2.385 g) dissolved in ethanol (volume of the resultant solution: 100 cc, La content: 0.00664 mol) was homogeneously mixed into the IPA solution of the Ti alkoxide.

Next, each aqueous solution of barium hydroxide and the mixture of the ethanol solution of lanthanum chloride and the IPA solution of the titanium alkoxide were mixed, and the resultant mixture was allowed to react to form a slurry. The slurry was poured into a tank for aging. Subsequently, the aged slurry was dehydrated to form a dehydrated cake, which was dried at 110° C. for three hours. The dried cake was crushed to thereby obtain a La-containing barium titanate powder.

To the thus-obtained La-containing barium titanate powder or to powder obtained by calcining the above powder at 800–1000° C. for two hours, a binder such as vinyl acetate was added to form granulated powder. The granulated powder was molded by uniaxial pressing to thereby form a disk-shaped compact having a diameter of 10 mm and a thickness of 1 mm. Subsequently, the compact was fired in air at 1200–1300° C. for two hours to form a semiconducting ceramic. A paste for producing an In—Ga electrode was applied to the two major surfaces of the semiconducting ceramic, and the entirety thereof was fired to thereby obtain a semiconducting ceramic electronic element.

Specific resistance at room temperature, dielectric strength, relative spectral intensity ratio represented by $BaCO_3$/BaO at the surface of the semiconducting ceramic and time-course change ratio of specific resistance at room temperature were measured in semiconducting ceramics having various Ba contents of barium hydroxide solutions for producing the semiconducting ceramic electronic element in the above-described manner. The results are shown in Table 1. Samples marked with * fall outside the scope of the present invention. Specific resistance at room temperature was measured at 25° C. by use of a four-point-probe method employing a digital voltmeter. The dielectric strength was obtained by measuring maximum applied voltage immediately before breakdown of a sample and dividing the voltage by the distance between two electrodes attached to the sample. The ratio $BaCO_3$/BaO at the surface of the semiconducting ceramic (including a cut section thereof) was obtained as a relative spectral intensity through XPS analysis. The time-course change ratio of the specific resistance at room temperature was a ratio of specific resistance at room temperature 1000 hours after the termination of firing to that immediately after firing.

A sample for comparison, which is referred to as "Comparative Example" in Table 1, was produced by use of a barium hydroxide solution having a different Ba content for producing the semiconducting ceramic electronic element in the above-described manner under firing at 1350° C. for two hours.

TABLE 1

| | Physical properties of semiconducting ceramic | | Characteristics of semiconducting ceramic | | |
| --- | --- | --- | --- | --- | --- |
| Sample No. | Average grain size | $BaCO_3$/BaO ratio | Specific resistance at room temperature (Ω·cm) | Dielectric strength (V/mm) | Time-course change ratio |
| 1 | 1.0 | 0.42 | 65 | 870 | 1.02 |
| 2 | 0.8 | 0.47 | 54 | 850 | 1.02 |
| 3 | 0.9 | 0.50 | 70 | 900 | 1.03 |
| *4 | 0.9 | 0.60 | 85 | 950 | 3.5 |
| *5 | 0.7 | 0.80 | 96 | 1120 | 10.00 |
| Comparative Example | 2.0 | 0.45 | 40 | 550 | 1.01 |

As is apparent from Table 1, when the average grain size of the semiconducting ceramic is about 1.0 μm or less and the relative spectral intensity ratio represented by $BaCO_3$/BaO at the surface thereof is 0.5 or less, the specific resistance at room temperature is 100 Ω·cm or less, the dielectric strength is 800 V/mm or more and the time-course change ratio is 1.05 or less.

Next will be described the reasons why the average grain size of the semiconducting ceramic and the relative spectral intensity ratio represented by $BaCO_3$/BaO at the surface thereof are limited in the present invention.

When the average grain size of the semiconducting ceramic is in excess of about 1.0 μm as in the case of the Comparative Example, the dielectric strength is disadvantageously low. Therefore, the average grain size is determined to be about 1.0 μm or less.

When the relative spectral intensity ratio represented by $BaCO_3$/BaO at the surface of the semiconducting ceramic is in excess of 0.5 as in the case of Samples 4 and 5, the time-course change ratio is disadvantageously high. Hence, the relative spectral intensity ratio is determined to be 0.5 or less.

Although La was used as a semiconducting agent in the present invention, no particular limitation is placed on the semiconducting agent. For example, there may be used a rare earth element such as Y, Sm, Ce, Dy or Ga; or a transition metal element such as Nb, Ta, Bi, Sb or W. In the present invention, barium titanate was synthesized through a hydrolysis method. However, other synthesis methods such as a sol-gel method, a hydrothermal method, a coprecipitation method, or a solid phase method may be applicable.

As described above, the semiconducting ceramic according to the present invention is formed of a sintered semiconducting material containing barium titanate, wherein the average grain size of the semiconducting ceramic is about 1.0 μm or less and the relative spectral intensity ratio represented by $BaCO_3/BaO$, which is determined by XPS at a surface of the ceramic, is 0.5 or less. The semiconducting ceramic according to the invention possesses a dielectric strength of 800 V/mm or more and a specific resistance at room temperature of 100 Ω·cm or less, the specific resistance at room temperature undergoing substantially no time-course change.

The semiconducting ceramic electronic element according to the present invention is produced by forming an electrode on each major surface of the above-described semiconducting ceramic. According to the invention, the thickness of the semiconducting ceramic electronic element can be reduced to as thin as 0.7–1.0 mm.

What is claimed is:

1. A semiconducting ceramic comprising a sintered barium titanate-containing semiconducting material which has an average grain size of about 1.0 μm or less and a relative spectral intensity ratio represented by $BaCO_3/BaO$ of 0.5 or less as determined by XPS at a surface of the ceramic.

2. The semiconducting ceramic of claim 1 wherein the barium titanate-containing semiconducting material is barium titanate.

3. The semiconducting ceramic of claim 1 wherein the barium titanate-containing semiconducting material contains a rare earth element or an transition metal element.

4. The semiconducting ceramic of claim 1 wherein the barium titanate-containing semiconducting material contains La.

5. A semiconducting ceramic electronic element comprising a semiconducting ceramic of claim 4 and a pair of spaced apart electrodes on the semiconducting ceramic.

6. A semiconducting ceramic electronic element comprising a semiconducting ceramic of claim 3 and a pair of spaced apart electrodes on the semiconducting ceramic.

7. A semiconducting ceramic electronic element comprising a semiconducting ceramic of claim 2 and a pair of spaced apart electrodes on the semiconducting ceramic.

8. A semiconducting ceramic electronic element comprising a semiconducting ceramic of claim 1 and a pair of spaced apart electrodes on the semiconducting ceramic.

9. The semiconducting ceramic of claim 1, wherein the average grain size is 0.9 μm or less.

10. A semiconducting ceramic electronic element comprising a semiconducting ceramic of claim 9 and a pair of spaced apart electrodes on the semiconducting ceramic.

* * * * *